Inventors
LEONARD LEWIN
CHARLES CECIL EAGLESFIELD
By Percy P. Lantz
Attorney

United States Patent Office 3,181,088
Patented Apr. 27, 1965

3,181,088
WAVEGUIDE CORNER JUNCTION WITH IMPROVED OPERATION BY USE OF DIAPHRAGMS REFLECTIVE AT GLANCING ANGLE
Leonard Lewin and Charles Cecil Eaglesfield, London, England, assignors to International Standard Electric Corporation, New York, N.Y., a corporation of Delaware
Filed Feb. 9, 1962, Ser. No. 172,314
Claims priority, application Great Britain, Mar. 30, 1961, 11,765/61
9 Claims. (Cl. 333—11)

This invention relates to electrical high frequency waveguide arrangements. More particularly, it relates to waveguide arrangements of the kind in which the direction of propagation of at least part of the guided energy is changed through a predetermined angle by means of a mirror system, and finds application in, for example, the right-angle corner bend, the hybrid T-junction, and like devices.

In prior art waveguide arrangements of the kind referred to, it has been customary to effect the desired change of direction of propagation by means of a single mirror, suitably disposed with respect to the incoming and outgoing directions in accordance with optical principles. However, the propagation conditions encountered in optics are not wholly identical with those encountered in waveguides operating on wavelengths even as short as a few millimetres, and as hereinafter explained, the performance of such a waveguide arrangement is imperfect, as shown by the appearance of unwanted higher order wave modes.

It is therefore the object of the present invention to provide a direction-changing waveguide arrangement in which the above mentioned imperfection is avoided. In order to achieve this object there is provided, according to the most general aspect of the invention, a H.F. electrical waveguide arrangement comprising two hollow metal waveguides of rectangular cross-section inclined at an angle to each other and coupled in series through a corner junction which includes a reflecting surface positioned to reflect at least part of the energy incident thereon from one of said waveguides into the other of said waveguides, said arrangement further comprising two diaphragms each disposed transversely across the union of a respective one of said waveguides with said junction unit, each said diaphragm being formed of material the electrical constants and dimensions of which are chosen conjointly such that at the operating wavelength the diaphragm is substantially transparent to energy normally incident thereon but reflects energy incident thereon at a glancing angle.

According to a more restricted aspect of the invention there is provided a H.F. electrical waveguide arrangement comprising two hollow metal waveguides of rectangular cross-section coupled in series through a right-angle corner-bend junction unit which includes a plane reflecting surface positioned to reflect at least part of the energy incident thereon from one of said waveguides into the other of said waveguides, said arrangement further comprising two diaphragms formed of dielectric material each disposed transversely across the union of a respective one of said waveguides with said junction unit, each said diaphragm being formed of dielectric material the thickness and permittivity of which are chosen conjointly such that at the operating wavelength the diaphragm is substantially transparent to energy normally incident thereon but reflects energy incident thereon at a glancing angle.

The invention will be better understood from the following discussion, taken in conjunction with the accompanying drawings, in which FIG. 1 is a diagrammatic illustration of a right-angle corner-bend waveguide arrangement in accordance with the present invention.

Figure 1:
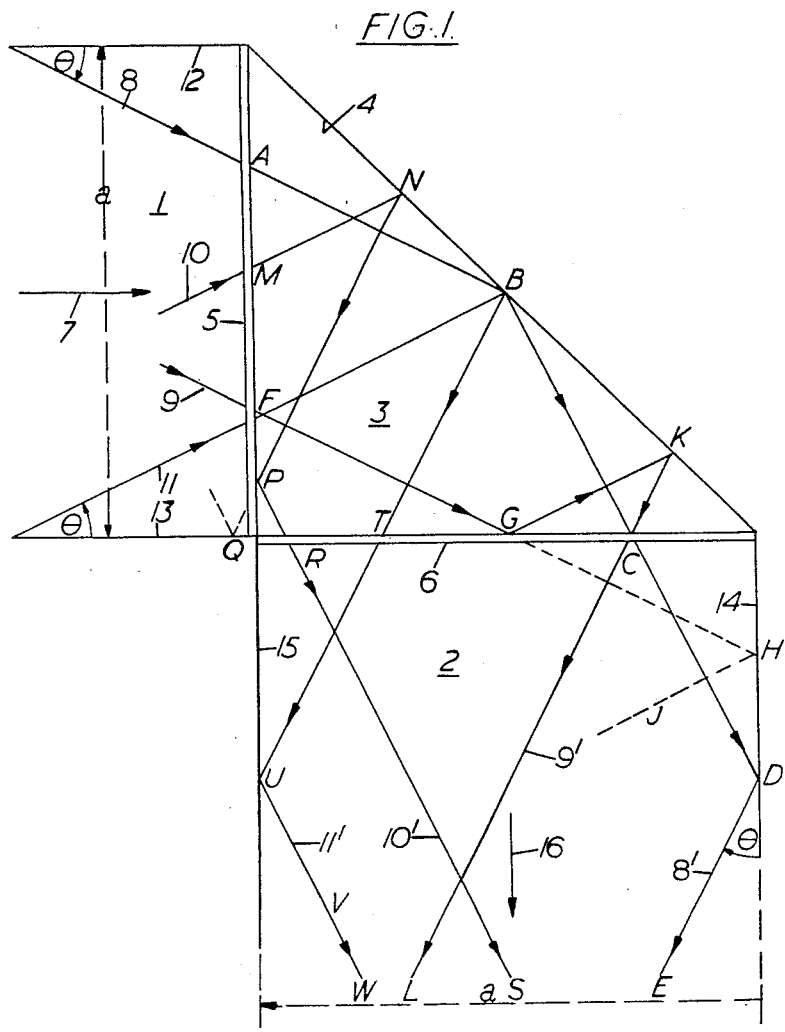

Referring now to FIG. 1, this illustrates diagrammatically a longitudinal section through a high frequency (H.F.) right-angle corner-bend waveguide according to the invention. The arrangement comprises first and second waveguides 1 and 2, of like rectangular cross-section, with their axes of propagation at right angles to each other, these waveguides being coupled together by means of a junction unit 3 which includes a plane reflecting surface 4 inclined to each of the said axes of propagation at an angle of 45° so that a plane wave transmitted through one of the said waveguides to strike the reflecting surface 4 at 45° incidence is reflected into the other of the said waveguides. The arrangement as so far described is well known. According to the present invention, however, the arrangement further comprises two diaphragms 5 and 6 made of dielectric material and positioned each at the union of a respective one of the waveguides 1 and 2 with the junction unit 3, each of these diaphragms being so constructed, as hereinafter explained, that at the operating wavelength the diaphragm is substantially transparent to wave energy normally incident thereon, but reflects energy incident thereon at a glancing angle.

The operation of the arrangement will now be discussed on the assumption that input energy is propagated in waveguide 1, in the direction indicated by arrow 7, in the rectangular $H_{10}$ mode, with the electric field polarized into the plane of the paper. Up to the union of waveguide 1 with junction unit 3, i.e. up to diaphragm 5, the field within waveguide 1 is by well known waveguide theory equivalent to the resultant of the fields produced by an ordinary plane wave which travels with the velocity of light, not in the direction 7, but at an angle $\theta$ thereto, progressing along the waveguide 1 in zigzag fashion as the result of repeated reflections from each of the opposing waveguide walls 12 and 13 in alternating succession. The value of $\theta$ is given by $\sin \theta = \lambda/2\alpha$, where $\lambda$ is the free space wavelength at the operating frequency, and $\alpha$ is the width of the waveguide as shown in FIG. 1.

Still referring to FIG. 1, there are indicated at 8 and 9 respectively the propagation paths of two plane wave fronts as determined by reflection at angle $\theta$ from the same wall 12 of waveguides 1. Similarly, at 10 and 11 there are indicated the propagation paths within waveguide 1 of two plane wave fronts as determined by reflection at angle $\theta$ from the wall 13. For the sake of clearness in the drawing $\theta$ has been shown as about 30°, but in practice the guide-width $\alpha$ may be of the order of 5λ or even greater, particularly in the case of overmoded guides for millimetre wavelengths, and $\theta$ should therefore be considered as of the order of 10° or less. Thus the plane wave fronts whose paths are indicated at 8, 9, 10 and 11 all strike diaphragm 5 at substantially normal incidence (for which the diaphragm is transparent) and are transmitted therethrough without change of course.

Take now each in turn of the paths 8, 9, 10 and 11. It will be seen from the drawing that the wave front characterized by path 8 enters the junction unit 3 at A without disturbance of course by diaphragm 5, is incident on the reflecting surface 4 at B, is reflected from B to hit diaphragm 6 at C with substantially normal incidence, and passes through diaphragm 6 without change of course to strike the wall 14 of waveguide 2 at D, being then reflected forward from D into waveguide 2 at angle $\theta$ with respect to wall 14, i.e. along the line D.E. Thus the wave front characterised by direction 8 in waveguide 1 follows the path ABCDE, which is the same path as it would follow in the absence of diaphragms 5 and 6.

While path 9 is parallel to path 8, it will be seen from the drawing that in the absence of diaphragm 6 the wave front travelling along path 9 would never hit the reflecting surface 4 at all, but would follow the course FGHJ, striking the wall 14 of waveguide 2 at H and being reflected therefrom into waveguide 2 at an angle $(90° - \theta)$ instead of $\theta$ i.e. not parallel to DE, the direction of the output wave which started along path 8. Parallelism is restored by means of the diaphragm 6. The wave front travelling along path 9 reaches diaphragm 5 with substantially normal incidence, passes through diaphragm 5 without change of direction, reaches diaphragm 6 at G with glancing incidence (glancing angle $\theta$), and is then reflected by diaphragm 6 to hit the reflecting surface 4 at K. From K the wave front is reflected back towards diaphragm 6 which it hits near C with substantially normal incidence and continues into the waveguides 2 without change of course, in the direction CL which is parallel to the direction DE and makes angle $\theta$ with respect to wall 14. Thus the wave front travelling in direction 9 in waveguide 1 follows the path FGCL, which is not the path it would follow in the absence of diaphragm 6, but which does bring it into waveguide 2 in parallelism with the direction of the output wave front corresponding intitially to direction 8 in waveguide 1.

The wave front whose path in waveguide 1 is indicated at 10 enters the junction unit 3 through the diaphragm 5 at M and continues without change of course until it hits the reflecting surface 4 at N. Reflection at N directs the wave front along the line NP, and in the absence of diaphragm 5 the wave front would proceed straight on until it struck the wall 13 of waveguide 1 at Q, and would never reach waveguide 2. This imperfection is removed by diaphragm 5, which is struck by the wave front at glancing incidence and reflects it along the direction PR to strike diaphragm 6 at R at substantially normal incidence and continue therethrough, without change of course, into waveguide 2 along the line RS which make angle $\theta$ with respect to wall 15 of waveguide 2. Thus the wave front travelling along direction 10 in waveguide 1 follows the path MNPRS, which is not the path it would follow in the absence of diaphragm 6, but which does bring it into waveguide 2 in a direction corresponding to the initial direction in waveguide 1.

In the case of the wave front whose path in waveguide 1 is indicated at 11, this wave front enters the junction unit 3 through the diaphragm 5 at F and continues without change of course until it hits the reflecting surface 4 at B. After reflection from B the wave front is directed into waveguide 2, passing through diaphragm 6 at T and continuing without change of course until it strikes the wall 15 of waveguide 2 at U, and is there reflected along the path UW which makes angle $\theta$ with the wall 15. Thus the wave front indicated by direction 11 in waveguide 1 follows the path FBUW, which is the same path as it would follow in the absence of the diaphragms 5 and 6.

While FIG. 1 illustrates the paths followed by only four components of the total field entering junction unit 3 from waveguide 11, it will be evident that the paths of all the other components can be similarly traced, and that only in the presence of the diaphragms 5 and 6 will all these components enter waveguide 2 with directional relationships corresponding to those in waveguide 1 and such that their resultant has the same energy content as in waveguide 1 but is directed at right angles thereto as indicated by arrow 16.

Figure 2:
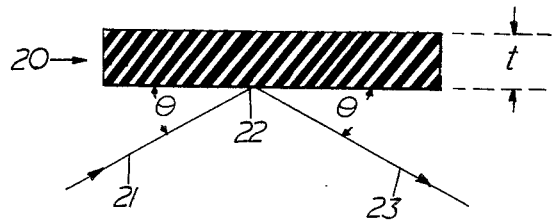
FIG. 2 is a sketch referred to in explanation of the choice of parameters of diaphragms used in embodiments of the invention.

The factors governing the design parameters of the like diaphragms 5 and 6 (FIG. 1) will now be discussed with reference to FIG. 2. In this figure the block 20 represents a cross-section through the thickness of a diaphragm composed of a sheet of dielectric material of thickness $t$ and permittivity $\epsilon$ relative to that of free space. At 21 is indicated a ray of plane wave energy, electrically polarised into the plane of the paper, incident at 22 on the sheet 20 at an angle $\theta$ relative to the surface of the sheet. Part of the energy incident at point 22 is reflected as indicated at 23 along a path such that the angle of reflection is equal to the angle of incidence. The remaining part of the energy incident at 22 passes (path not shown) through the dielectric sheet 20 in accordance with the usual laws of refraction.

Assuming that the medium in which the dielectric sheet is immersed is air, and that the operating free space wave length is $\lambda$, it can be shown that $r$, the coefficient of reflection at point 22, satisfies the equation $$(1+r)/(1-r) = [1+jT(\sin\theta)/E]/[1+jTE/(\sin\theta)] \quad (1)$$

in which $k = 2\pi/\lambda$ $E = \sqrt{(\epsilon - \cos^2\theta)}$ $T = \tan(ktE)$ For the diaphragm to be transparent, $r$ must equal zero, i.e. $T = \tan\pi$. Let this condition be met at the design operating wavelength $\lambda_{01}$ for energy incident at substantially normal incidence ($\theta \simeq 90°$). Then $\cos\theta$ is substantially zero, and we get $$\pi = KtE$$
$$= 2\pi t\sqrt{\epsilon}/\lambda_0$$
$$t = \lambda_0/2\sqrt{\epsilon}$$

and for other values of $\theta$ and $\lambda$ we then have $$kTE = \frac{\pi\lambda_0}{\lambda}\sqrt{\left(1 - \frac{\cos^2\theta}{\epsilon}\right)} \quad (2)$$

This gives $ktE = \pi$ when $$\lambda = \lambda_0\sqrt{\left(1 - \frac{\cos^2\theta}{\epsilon}\right)}$$

so that if $\epsilon$ is large, a closely neighbouring frequency will see the diaphragm as transparent at different angle $\theta$ including $\theta = 0$. This is undesirable behavour for a wideband device, and hence it is concluded that $\epsilon$ must not be large. Moreover, the reflection from the dielectric sheet at normal incidence at a frequency spaced $df$ away from the central frequency $f$ can be written in the form $$r = \frac{\pi}{2} \cdot \frac{df}{f}(\epsilon - 1)/\epsilon \quad (3)$$

and it is again apparent that for reasonable working band $\epsilon$ should not be large. Therefore, to get good reflection at glancing incidence it is clear that some property of Equation 1 must be used that does not require $\epsilon$ to be large.

On going back to Equation 1 it will be seen that when $\theta$ is zero the denominator of the right hand side of the equation becomes infinite, and $r$ becomes equal to $-1$. It is therefore the largeness of the term $TE/\sin\theta$ which is important. Assuming that this term is large, the approximate value of $r$ is given by:

$-r \simeq 1 - 2\sin^2\theta/(\epsilon - \cos^2\theta)$
$+j2(\sin\theta)(\epsilon - 1)\sqrt{(\epsilon - \cos^2\theta)}/[T(\epsilon - \cos^2\theta)^2] \quad (4)$ If $\theta$ is sufficiently small, putting $\sin\theta = \lambda/2a$ in Equation 4 gives $$-r \simeq 1 - 2\lambda^2/[\epsilon - 1)(2a)^2] + 2j\lambda/[2aT\sqrt{(\epsilon - 1)} \quad (5)$$

Thus $r$ differs from minus unity by an amount approximately equal to $$2(\lambda/2a)^2/(\epsilon - 1)$$

and includes a phase change approximately equal to $$(2/T)(\lambda/2a)/\sqrt{\epsilon-1}$$

It is required that both of these be small, consistent with a small value of $\epsilon$. This means that $2a \gg \lambda$, and $T \gg 1$. The first of these two conditions is met by making the guide large enough, while the second is met by so designing that the angle of $T$ at $\theta=0°$ is $\pi/2$, i.e. half the angle of $T$ at $\theta=90°$. In this way transparency at normal incidence becomes non-transparency at glancing incidence, if $$\sqrt{\epsilon-\cos^2 90°} = 2/\sqrt{\epsilon-\cos^2 0°}$$

or $$\epsilon = 4/3$$

With this value of $\epsilon$ which can be obtained by a suitably foamed dielectric material such as foamed polystyrene, $T$ for $\theta=0°$ becomes infinite at mid-band. At a frequency deviation $df$, $T$ becomes $(2/\pi)(f/df)$, and the phase error at the edge of the band is given by $$\pi(\lambda/2a)\sqrt{3}(df/f)$$

As an example, consider the case in which the operating bandwidth is 20%, i.e. $df/f$ is equal to 0.1, and the diaphragm is formed from material having $\epsilon=4/3$. By Equation 3, at the edge of the band the reflection at normal incidence to the diaphragm is 0.045, corresponding to a return loss of 26 db in the main wave mode. If the guide side is, say five wavelengths at mid-band, Equation 5 gives a reflection coefficient of 94% with a phase change 3° at the edge of the band.

If it is more important to reduce the reflection from the diaphragm at normal incidence than to provide exactly the reflection required at glancing incidence, then an even smaller value of $\epsilon$ should be used, the effect of the reduction in $\epsilon$ being calculated with the aid of Equation 3. For example, a reduction of the value of $\epsilon$ from 4/3 to say 1.1 would reduce the reflection at normal incidence by a further 10 db at the edge of the band, while its main additional effect would be to alter the phase of the reflection at glancing incidence by about 20° and reduce the amplitude of such reflection to about 0.8.

Figure 3:
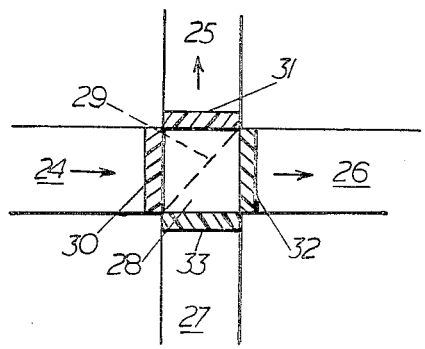
FIG. 3 is a diagrammatic illustration of a hybrid-T waveguide arrangement embodying the principles of the present invention.

Turning now to FIG. 3, this illustrates diagrammatically how the principles of the present invention may be applied in a hybrid-T waveguide arrangement. The arrangement comprises four waveguide arms 24, 25, 26 and 27 of rectangular cross-section and all communicating with a common junction space 28, the arms 24 and 26 being colinear, and the arms 25 and 27 being also colinear but orthogonally disposed with relation to arms 24 and 26. At 29 is indicated a half-silvered mirror diagonally spanning the junction space so as to make an angle of 45° with respect to the longitudinal axes of each of the four arms. The arrangement as so far described is well known in the waveguide art, and it is therefore considered unnecessary to describe the mode of operation except to remark that one part of the energy fed to the arrangement over any one arm, say arm 24, transverses the half-silvered mirror 29 to appear in the opposing arm, in this case arm 26, while the remainder of the energy incoming through arm 24 is reflected by the mirror and suffers a change of course of (theoretically) 90°, appearing in arm 25. As explained in connection with FIG. 1, however, the performance of the mirror by itself is imperfect, and in order to remove this imperfection the arrangement includes four like diaphragms of dielectric material as indicated in FIG. 3 at 30, 31, 32 and 33, each diaphragm being located at the union of a respective one of the four arms 24, 25, 26 and 27 with the common junction space 28, the thickness and permittivity of the diaphragm be chosen such as to satisfy at the desired operating frequency band the condition that the diaphragm is substantially transparent to energy normal incident thereon but reflects energy incident thereon at a glancing angle.

Figure 4:
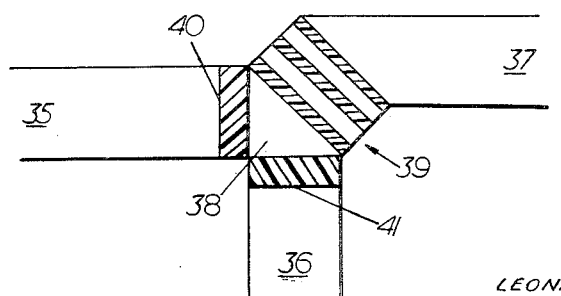
FIG. 4 is a diagrammatic representation of a channel-dropping waveguide filter arrangement embodying the principles of the present invention.

FIG. 4 illustrates diagrammatically how the principles of the invention may be applied to a channel-dropping waveguide filter arrangement for use in a multi-channel communication system of the frequency-division type. Referring to FIG. 4, the arrangement comprises an input multi-channel main waveguide arm 35 adapted for the transmission of a plurality of channels, an output multi-channel main waveguide arm 36, and a drop-channel waveguide arm 37, arms 35 and 36 having their directions of propagation normal to each other, and all the arms being coupled into a junction space 38. The drop-channel 37 is coupled into the junction via a multi-layer dielectric-sandwich filter 39 adapted to pass the narrow frequency band occupied by the channel to be dropped, and to reflect all other frequencies with the band occupied by the multi-channel signals. The filter 39 is disposed with its layers making an angle of 45° with respect to the respective directions of propagation of all three arms. The displacement of the axis of drop-channel arm 37 takes account of the displacement of the ray passing through filter 39. Single-layer dielectric diaphragms 40 and 41 are located at the unions of main arms 40 and 41 respectively with the junction space 38, the material of these diaphragms having such thickness and such permittivity that over the whole multi-channel band of frequency each diaphragm is substantially transparent to energy normally incident thereon but reflects energy incident thereon at a glancing angle. The purpose of these two diaphragms 40 and 41 is to improve the efficiency of the course-changing imposed on that part of the multi-channel energy from arm 35 which is reflected by filter 39 and passes into the output arm 36 instead of into the drop-channel arm 37, the operation of the course-changing being similar to that already explained in connection with FIG. 1.

It will be appreciated that further channels can be dropped as required by feeding the output delivered over arm 36 into successive filter arrangements similar to that of FIG. 4 except that the pass band of the sandwich filter coupling the drop-channel arm to the junction space is adapted in each case to pass the frequency band of the channel to be dropped in that case.

It will also be understood that the device illustrated in FIG. 4 may be used for channel injection purposes instead of channel-dropping, multi-channel energy being fed towards the junction space 38 over arm 36, and the channel to be injected being fed to the junction space 38 over arm 37, with the combination of the feeds over arms 36 and 37 appearing in arm 35.

In the embodiments hereinbefore described each diaphragm has been formed as layer of dielectric material of suitable thickness and permittivity. However, the invention is not restricted to this particular form of diaphragm, and any convenient form may be used provided that over the operating band of frequencies it meets the requirements of being substantially transparent to rays which are perpendicularly incident thereon but substantially reflecting to rays falling with glancing incidence. For example, the diaphragm may be of dielectric material with a non-planar surface configuration, i.e. grooved or corrugated; or it may be of a material having magnetic as well as dielectric properties.

While the principles of the invention have been described above in connection with specific apparatus, it is to be clearly understood that this description is made only by way of example and not as a limitation on the scope of the invention.

We claim:
1. An electrical waveguide arrangement comprising:
at least two hollow waveguides disposed adjacent each other,
means to change the direction of propagation of the energy from one of said waveguides to the other of said waveguides, said direction changing means coupling said waveguides together,
and a diaphragm coupled to the end of each waveguide adjacent said direction changing means, each said diaphragm being adapted to be substantially transparent to energy normally incident thereon but reflective to energy incident thereon at a glancing angle so that the direction of propagation of energy in one of said waveguides with respect to the axis of said waveguide through said diaphragms and by reflection from said direction changing means is substantially maintained in the other of said waveguides with respect to the axis of said other waveguide.

2. A high-frequency electrical waveguide arrangement comprising:
   at least two hollow metal waveguides disposed adjacent each other,
   a reflective corner junction coupling said waveguides in series,
   said reflective corner junction being adapted to change the direction of propagation of energy from one of said waveguides to the other of said waveguides,
   and a diaphragm disposed transversely across the junction of each said waveguide with said corner junction,
   each said diaphragm being formed of material the electrical constants and dimensions thereof being chosen such that at the operating wavelength of said waveguide said diaphragm is substantially transparent to energy normally incident thereon but reflects energy incident thereon at a glancing angle,
   and the direction of propagation of energy in one of said waveguides with respect to the axis of said waveguide through said diaphragms and by reflection from said reflective corner junction is substantially maintained in the other of said waveguides with respect to the axis of said other waveguide.

3. A high-frequency electrical waveguide arrangement according to claim 2 wherein said corner junction includes a reflecting surface disposed to reflect at least part of the energy incident thereon from one of said waveguides into the other of said waveguides.

4. A high-frequency electrical waveguide arrangement comprising:
   two hollow metal waveguides of rectangular cross-section disposed adjacent each other,
   a right-angle corner bend junction unit coupling said waveguides together,
   said corner bend junction unit including a plane reflecting surface positioned to reflect at least part of the energy incident thereon from one of said waveguides into the other of said waveguides,
   and a diaphragm formed of dielectric material disposed transversely across the junction of each of said waveguides with said junction unit,
   each said diaphragm being formed of dielectric material, the thickness and permittivity of which are chosen conjointly such that at the operating wavelength of said waveguide the diaphragm is substantially transparent to energy normally incident thereon but reflects energy incident thereon at a glancing angle,
   and the direction of propagation of energy in one of said waveguides with respect to the axis of said waveguide through said diaphragms and by reflection from said plane reflecting surface is substantially maintained in the other of said waveguides with respect to the axis of said other waveguide.

5. A high-frequency electrical waveguide arrangement according to claim 4 wherein the thickness of said diaphragm material is equal to $$\frac{\lambda_0}{2}\epsilon$$

where $\lambda_0$ is the midband operating wavelength and $\epsilon$ is the relative permittivity of said diaphragm material.

6. A high-frequency electrical waveguide arrangement according to claim 5 wherein the value of said permittivity is not greater than 1.33.

7. A high-frequency electrical waveguide arrangement according to claim 6 wherein said dielectric material comprises a foamed material.

8. A hybrid-T waveguide device comprising:
   first, second, third and fourth hollow metal waveguides of rectangular cross-section disposed in orthogonal relation to each other,
   with said first and second waveguides being colinear and said third and fourth waveguides being colinear and disposed in orthogonal relation to said first and second waveguides,
   a junction coupling said waveguides together in said colinear and orthogonal relation,
   said junction including a plane reflecting surface disposed to reflect at least part of the energy incident thereon from one of said waveguides into the others of said waveguides,
   and a diaphragm formed of dielectric material disposed transversely across the junction of each of said waveguides with said junction,
   each said diaphragm being formed of dielectric material, the thickness and permittivity of which are chosen conjointly such that the operating wavelength of the diaphragm is substantially transparent to energy normally incident thereon but reflects energy incident thereon at a glancing angle and the direction of propagation of energy in each of said waveguides with respect to the axis of said waveguide through said diaphragms and by reflection from said plane reflecting surface is substantially maintained in the others of said waveguides with respect to the axes of said waveguides.

9. A channel-dropping waveguide filter device comprising:
   at least three hollow metal waveguides of rectangular cross-section,
   a corner junction coupling said waveguides together such that two of said waveguides are disposed in orthogonal relationship to each other,
   a diaphragm disposed transversely across each of said first and second waveguides at the junction of said waveguides with said corner junction,
   a filter coupling said third waveguide to said corner junction, said filter being transparent to one of the frequencies of the multi-channel band of frequency of the energy propagated in said first and second waveguides and reflective to all other frequencies,
   and the material of the diaphragms having such thickness and such permittivity that over the whole multi-channel band of frequency each diaphragm is substantially transparent to energy normally incident thereon but reflects energy incident thereon at a glancing angle and the direction of propagation of energy of said all other frequencies in one of said waveguides disposed in orthogonal relationship with respect to the axis of said waveguide through said diaphragms and by reflection from said filter changing means is substantially maintained in the other of said waveguides with respect to the axis of said other waveguide.

References Cited by the Examiner

UNITED STATES PATENTS 2,757,575   8/56   Kovach ---------------- 88—68

HERMAN KARL SAALBACH, *Primary Examiner.*

UNITED STATES PATENT OFFICE
CERTIFICATE OF CORRECTION

Patent No. 3,181,088                          April 27, 1965

Leonard Lewin et al.

It is hereby certified that error appears in the above numbered patent requiring correction and that the said Letters Patent should read as corrected below.

Column 7, lines 67 and 68, for $$\frac{\lambda_o}{2} \epsilon \quad\quad\quad \text{read} \quad\quad\quad \frac{\lambda_o}{2\sqrt{\epsilon}}$$

column 8, line 26, after "that" insert -- at --; line 27, after "of" insert -- said waveguide --; lines 48 and 54, for "frequency", each occurrence, read -- frequencies --.

Signed and sealed this 30th day of November 1965.

(SEAL)
Attest:

ERNEST W. SWIDER                                 EDWARD J. BRENNER
Attesting Officer                                    Commissioner of Patents